(12) United States Patent
Knappe et al.

(10) Patent No.: US 6,603,774 B1
(45) Date of Patent: Aug. 5, 2003

(54) SIGNALING AND HANDLING METHOD FOR PROXY TRANSCODING OF ENCODED VOICE PACKETS IN PACKET TELEPHONY APPLICATIONS

(75) Inventors: Michael E. Knappe, San Jose, CA (US); David R. Oran, Acton, MA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/169,560

(22) Filed: Oct. 9, 1998

(51) Int. Cl.[7] .................................................. H04J 3/16
(52) U.S. Cl. .................. 370/466; 370/352; 370/389; 370/401; 379/88.17
(58) Field of Search ........................ 370/400, 401, 370/410, 465, 466, 467, 235, 236, 252, 352, 353, 354, 356; 379/88.17

(56) References Cited

U.S. PATENT DOCUMENTS

| | | | |
|---|---|---|---|
| 4,506,358 A | | 3/1985 | Montgomery |
| 4,991,169 A | | 2/1991 | Davis et al. |
| 5,586,117 A | * | 12/1996 | Edem et al. ................. 370/447 |
| 5,790,648 A | * | 8/1998 | Bailis et al. ................. 370/466 |
| 6,014,440 A | * | 1/2000 | Melkild et al. .............. 370/466 |
| 6,061,734 A | * | 5/2000 | London ........................ 380/29 |
| 6,072,803 A | * | 6/2000 | Allmond et al. ............. 370/445 |
| 6,125,122 A | * | 9/2000 | Favichia et al. ............. 370/466 |
| 6,141,345 A | * | 10/2000 | Goeddel et al. ............. 370/389 |
| 6,353,620 B1 | * | 3/2002 | Sallberg et al. ............. 370/410 |

* cited by examiner

*Primary Examiner*—Douglas Olms
*Assistant Examiner*—Bob A. Phunkulh
(74) *Attorney, Agent, or Firm*—Marger Johnson & McCollom, PC

(57) ABSTRACT

Voice packets are redirected in packet telephony applications to a codec proxy system that makes voice endpoints involved in an end-to-end call appear to be using the voice codec required of it by the other endpoint, even if the endpoints do not possess the required codec capability. The codec proxy system acts as a broker during initial capability negotiations, and as a real-time transcoding facility between disparate codec capabilities once voice traffic begins. The resulting system allows non-standard, cost-optimized and/or feature specific packet voice endpoints to interoperate in a standards-based network.

11 Claims, 5 Drawing Sheets

SIGNALING AND HANDLING METHOD FOR PROXY TRANSCODING OF ENCODED VOICE PACKETS IN PACKET TELEPHONY APPLICATIONS

BACKGROUND OF THE INVENTION

This invention relates to a packet-based telephony network and more particularly to a proxy system that negotiates codec schemes between different telephony systems in the telephony network.

Packet based networks digitize audio signals and convert the digitized signals into data packets. A telephony system connected to the packet based network groups voice samples that may or may not be compressed together into the data packets. The data packets are encoded and then encapsulated with a header that includes a destination address. The encapsulated data packets are sent to another telephony system in the packet based network associated with the destination address. Upon reception by the destination telephony system, the data packets are reassembled into the original voice sample stream decoded and output to a listener.

Signaling primitives must be interpreted and possibly converted between the different telephony systems in the telephony network. The encoding characteristics of each telephony system endpoint, such as voice compression, packet size, and voice/video capabilities, must be determined between the different telephony systems in order to establish a media connection over the packet based network. There are many different types of packet telephony systems with different encoding characteristics, both standard and proprietary. This makes it likely that the encoding scheme used by a telephony system originating a telephone call may not be compatible with the encoding scheme used by the telephony system at the call destination. If encoding schemes are not compatible, a telephone call cannot be established.

Efforts have been made within communication standards to use a lowest common denominator voice codec within any one packet telephony standard. However, telephony systems may employ different communication standards that do not communicate with each other. For example, opposite endpoints for a telephone call may use the same compression encoding technique, but use different telephony capability exchange protocols. If the telephony capability exchange protocols used by the two endpoints are incompatible, a call cannot be completed.

Accordingly, a need remains for ensuring the establishment of calls between different telephony systems in a packet based network.

SUMMARY OF THE INVENTION

Voice packets are redirected in packet telephony systems to a codec proxy system that makes voice endpoints involved in an end-to-end call appear to be using the voice codec required of it by the other endpoint, even if the endpoints do not possess the required codec capability. The codec proxy system acts as a broker during initial capability negotiations, and as a real-time transcoding facility between disparate codec capabilities once voice traffic begins. The resulting system allows non-standard, cost-optimized and feature specific packet voice endpoints to interoperate in a standards-based network. Processing resources that already reside in a packet based network, (e.g., routing and signal processing engines) are used as a platform for the codec proxy system. No new hardware facilities are, therefore, necessarily required to implement the proxy system.

A capability exchange broker in the codec proxy system determines how codecs on different endpoints of the telephone call are transcoded and returns capability exchange responses required by the signaling telephony system. The codec proxy system then determines the codec schemes that need to be used by the two packet telephony systems for establishing and conducting the telephone call. The codec information determined by the proxy system is then relayed to the two endpoints. If no compatible codec scheme exists between the two endpoints, a packet transcoder and rebuffering circuit provides the real-time packet-to-packet conversion from one codec scheme to another as determined by the capability exchange broker.

The foregoing and other objects, features and advantages of the invention will become more readily apparent from the following detailed description of a preferred embodiment of the invention, which proceeds with reference to the accompanying drawings.

DETAILED DESCRIPTION

Figure 1:
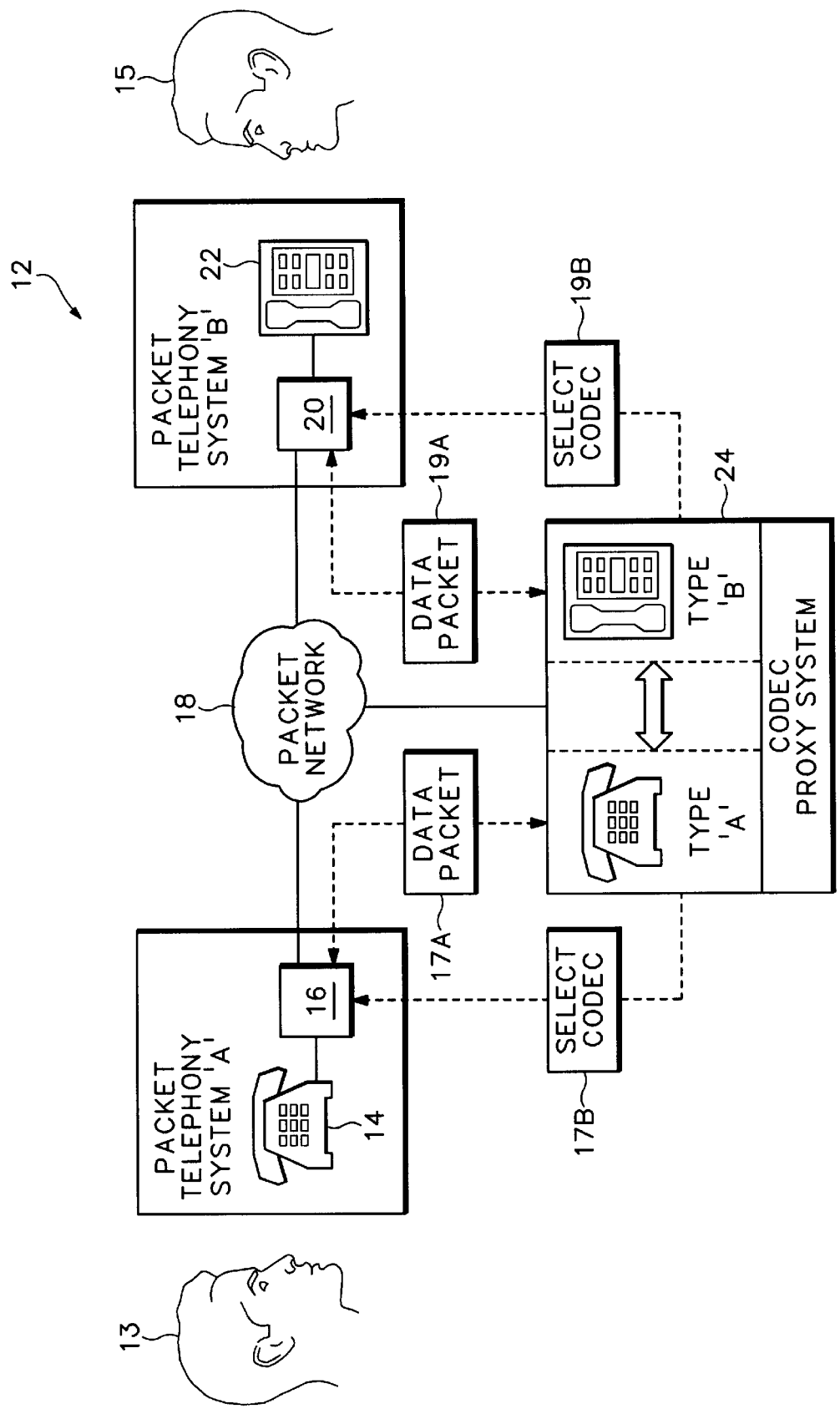
FIG. 1 is a diagram of a codec proxy system according to the invention.

FIG. 1 is a diagram of the general topology of a packet based network system 12 according to the invention. A packet telephony system 'A' includes a telephone handset 14 connected to a packet network 18 through a gateway 16. The gateway 16 includes a codec for converting audio signals into audio packets 17 and converting the audio packets back into audio signals. A packet telephony system 'B' includes a handset 22 connected to the packet network 18 through a gateway 20. The gateway 20 includes another codec for converting back and fourth between audio signals and audio packets 19.

The handsets 14 and 22 are traditional telephones. Gateways 16 and 20 and the codecs used by the gateways are any one of a wide variety of currently commercially available devices used for connecting the handsets 14 and 22 to the packet network 18. For example, the gateways 16 and 20 can be VoIP telephones or personal computers that include a digital signal processor (DSP) and software for encoding audio signals into audio packets. Since packet telephony gateways and codecs are well known, they are not described in further detail.

A codec proxy system 24 is coupled to the packet network 18 and is used for setting up calls between system 'A' and system 'B'. The codec proxy system 24 negotiates and, if necessary, transcodes packets between different encoding techniques used by system's A and B. The codec proxy system 24 is installed on any network element in packet network 18 having a processor that can be programmed to perform the proxy services described below. For example, the codec proxy system 24 can be installed on any VoIP routing engine such as Model Nos. 2600, 3600, 5300, 3810 manufactured by Cisco Systems, Inc., 170 West Tasman Drive, San Jose, Calif. 95134-1706.

In standards used for packet based multimedia communication, such as H.323, the telephony systems 'A' and 'B' send capability lists to each other indicating codec availability. One of the endpoints 'A' or 'B' determines if a common codec is available for establishing a telephone call. If the two telephony systems 'A' and 'B' use different communication standards, codec negotiation can not take place, even if a common codec capability exists at both endpoints 'A' and 'B'.

The gateway 16 in telephony system 'A' may use a first communication protocol such as a Simple Gateway Control Protocol (SGCP). The gateway 20 might use a second packet protocol such as H.323. The invention allows calls to be established between these different communication standards that might be used with different networks such as Internet Protocol (IP), Asynchronous Transfer Mode (ATM) or Frame Relay.

A telephone user 13 on telephony system 'A' dials a number on the handset 14 that resides within the domain of telephony system 'B'. The gateway 16 converts the dialed number into packet 17A that is placed onto the packet network 18. The codec proxy system 24 intercepts the packet 17A and reads any capability negotiation messages from system 'A'. The codec proxy system 24 determines the codec/preferences or capabilities of system 'A' from the capability negotiation messages in the packet 17A. For example, the capability negotiation message may comprise a H323 capability list.

The codec proxy system 24, either with an existing knowledge of the capabilities of system 'B' or from earlier user provisioning or an exchange of capability messages with system 'B', selects a codec in gateway 16 and 20. Packet 17B includes the codec selected for gateway 16 and packet 19B includes the codec selection for gateway 20. It is important to note that the communication standard used to negotiate the codec for gateway 16 might be different than the standard used to negotiate the codec for gateway 20. If possible, the selected codec is compatible with the codec used in system 'A'. Systems A and B then establish a call using the negotiated codecs.

No common codec may exit between systems 'A' and 'B', or network conditions, such as available bandwidth may make choosing a common codec inappropriate. In this case, the codec proxy system 24 selects and returns to system 'A' in packet 17B an acknowledgement of a system 'A' codec request that best fits a user codec profile (e.g. best quality; lowest bandwidth, etc.). Alternatively, the codec proxy system 24 defaults to a best known quality pairing for the different codecs in system's 'A' and 'B'. The codec proxy system 24 also returns, if necessary, a request for the codec selected for system 'B' to the system 'B' endpoint in packet 19B. After these negotiations are complete, the system 'A' endpoint believes it has negotiated a type 'A' codec with system 'B' and system 'B' believes it has negotiated a type 'B' codec with system 'A'. All real-time speech packets transmitted during this call are then intercepted by the codec proxy system 24 and transcoded and reframed according to the negotiated packet size and compression requirements of the destination endpoint.

Figure 2:
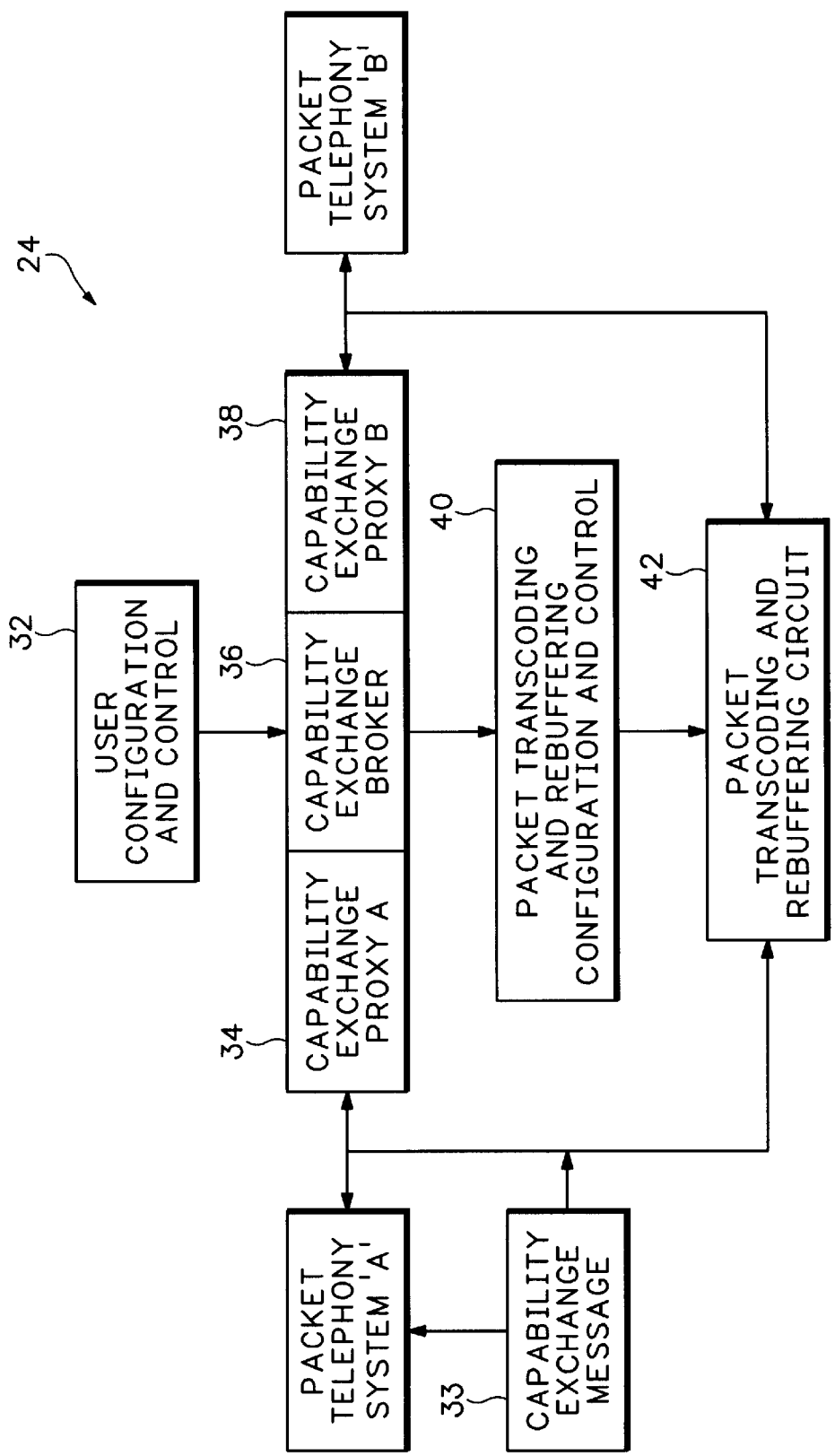
FIG. 2 is a detailed diagram of the codec proxy system shown in FIG. 1.

Referring to FIG. 2, the codec proxy system 24 comprises a capability exchange broker 36 and a packet transcoding and rebuffering circuit 42. The capability exchange broker 36 can spoof the two packet telephony systems 'A' and 'B', as described above, into believing they are transferring data packets having a common codec scheme.

Depending on the specifics of each packet telephony system 'A' and 'B', the capability exchange broker 36 provides a capability exchange proxy 34 and 38, respectively. If capability exchange messages for telephony system 'A' use the H.245 standard, the capability exchange proxy 'A' includes the software for conducting a H.245 call setup. Capability exchange proxies 34 and 38 determine and acknowledge codec choices for the telephony systems 'A' and 'B', respectively, or use static a priori knowledge of a telephony system's capabilities to select known codecs.

Telephony system 'A' (FIG. 1) may have a choice of two codecs, International Telecommunication Union ITU-T's G.711 64 thousand bits per second (kbit/s) codec and G.729 8 kbit/s codec, as well as a capability exchange mechanism. System 'B', however, may only have a G.723.1 6.3 kbit/s codec statically available with no negotiation mechanism.

The capability exchange broker 36 has been previously provisioned from user configuration and control signals 32 to allow best quality/highest bandwidth on the system 'A' side of the network. In a call setup from system 'A' to 'B', the capability exchange proxy 34 sends a capability exchange message 33 to telephony system 'A' to select G.711. For telephony system 'B', the choice of G.723.1 is implicit in its static configuration and no capability messages are exchanged with the capability exchange proxy 38.

At the end of the capability exchange phase, the capability exchange broker 36 generates configuration and control information 40 that identifies the necessary transcoding, if any, that is required between the two telephony systems 'A' and 'B'. Given the transcoding and rebuffering requirements 40 sent from the capability exchange broker 36, the packet transcoding and rebuffering circuit 42 provides the real-time conversion between disparate compression schemes and/or frames sizes (number of speech samples/frame). For example, the packet transcoding and rebuffering circuit 42 uses the configuration and control information to transcode between the G.711 codec selected for telephony system 'A' and the G.723.1 codec used in telephony system 'B' in the appropriate order depending on transmission direction. Specific transcoding operations performed by the packet transcoding and rebuffering circuit 42 vary depending on the nature of the disparity between the codecs. FIGS. 3–6 below show some of these different transcoding and rebuffering operations that may be required.

Same Codec, Different Frame Sizes

The same compression scheme may be used on both telephony systems 'A' and 'B', but the number of speech samples or speech frames in a packet may be different between system 'A' and 'B'. In this case, the packet transcoding and rebuffering circuit 42 provides an asynchronous rebuffering and repacking of samples or frames into a new packet that meets the packet length requirements of the destination telephony system.

Figure 3:
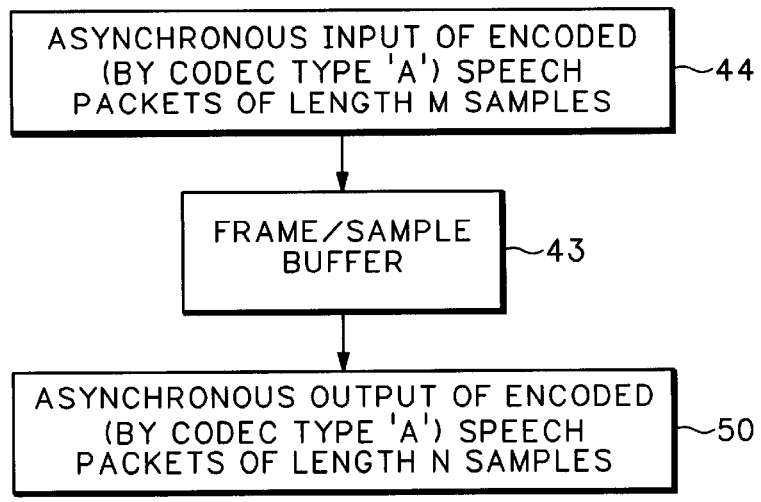
FIG. 3 is a diagram of a frame/sample buffer used in the codec proxy system shown in FIG. 2
Figure 4:
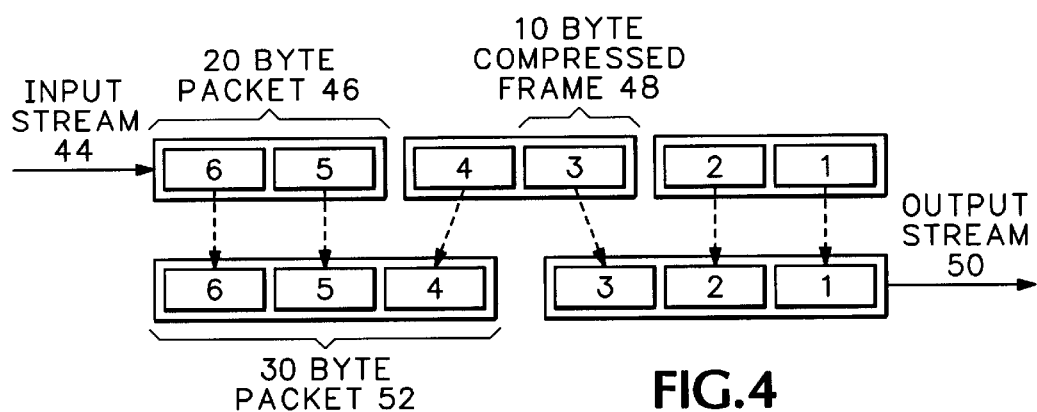
FIG. 4 is a diagram showing how the frame/sample buffer shown in FIG. 3 repacks speech frames.

FIG. 3 is a frame/sample buffer 43 used in the packet transcoding and rebuffering circuit 42 shown in FIG. 2. An example repacking scenario using the rebuffering buffer 43 is shown in FIG. 4. An asynchronous input stream 44 of 20 byte G.729 packets 46 is sent by telephony system 'A' (FIG. 2). Each packet 46 includes two 10-byte G.729 compressed frames 48. The packets 46 are converted to an asynchronous output stream 50 of 30 byte G.729 packets 52. Each G.729 packet 52 includes three 10-byte G.729 compressed frames 48. The frame sample and rebuffering performed in frame/sample buffer 43 is asynchronous in nature. This means that as soon as any outgoing packet 52 is filled, it is transmitted to the destination telephony system.

If the frame/sample buffer 43 used buffers to remove jitter, delay could be added to the overall network. The capability exchange broker 36 is located at an intermediate point in the packet network 18 and therefore does not have to account for packet jitter. The telephony system receiving the output stream 50 is therefore used to handle any packet to packet jitter caused by the rebuffering performed in frame/sample buffer 43.

Different Codecs

Figure 5:
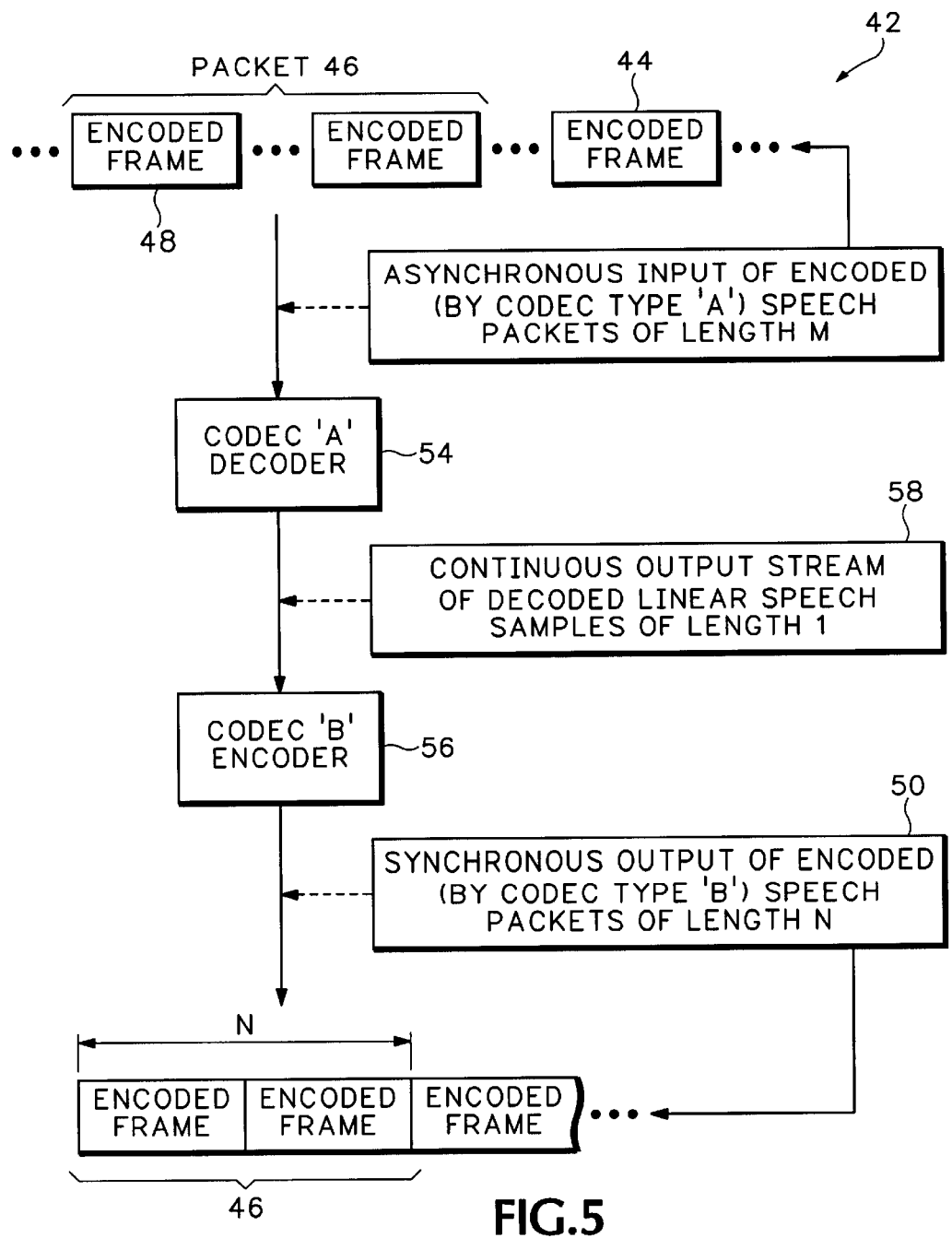
FIG. 5 is a block diagram of a decoder and encoder circuit used in one embodiment of the codec proxy system shown in FIG. 2.

FIG. 5 shows the transcoding scheme for sample-by-sample streaming. Referring to FIG. 5, when different codecs are used in the two telephony systems 'A' and 'B', speech is transcoded between the different codec schemes by the packet transcoding and rebuffering circuit 42. A codec 'A' decoder 54 is the same decoder used in the telephony system 'A' and codec 'B' encoder 56 is the same encoder used in the telephony system 'B'. Since the encoder and decoder are known to those skilled in the art, they are not described in further detail. The asynchronously arriving encoded frames 48 are first decoded with the codec 'A' decoder 54 to a linear 16-bit encoding in order to minimize voice quality degradation.

The continuous output stream from codec 'A' decoder 54 is passed either as separate samples or collected frames to the codec 'B' encoder 56. To minimize end-to-end delay, no buffering is performed for late or out-of-order packets arriving at the codec 'A' decoder 54. Any loss of late or out-of-order packets 46 are mitigated by standard packet loss interpolation mechanisms provided by the codec 'A' decoder 54. In this case, there would be a one or two packet buffer in codec 'A' decoder 54 to perform the necessary interpolation. The codec B encoder 56 encodes the interpolated continuous output stream 58 from the decoder 54 into an output stream 50 of synchronous speech packets 46. The packets 46 in output stream 50 from encoder 56 are sent to the destination telephony system 'B'.

Figure 6:
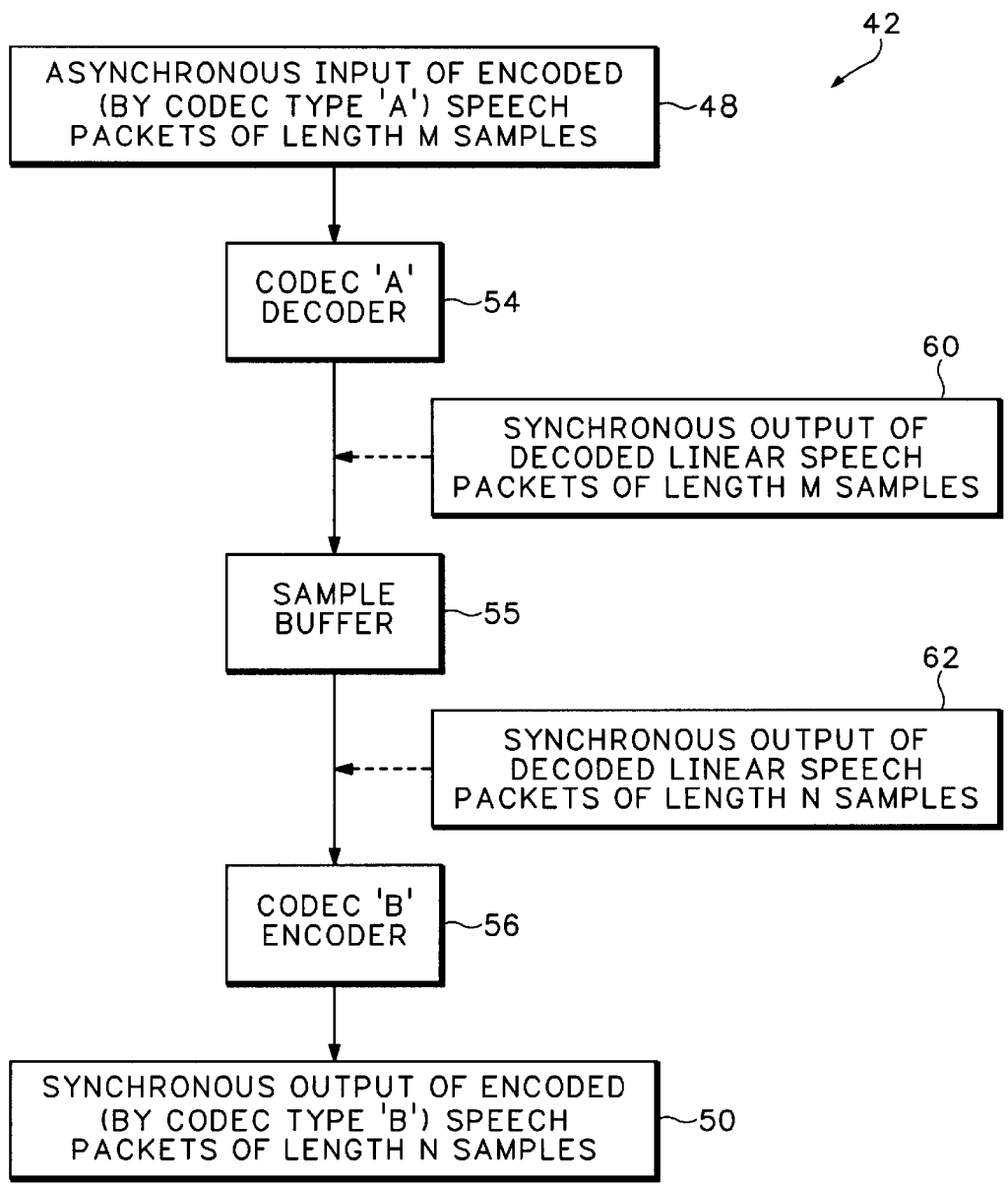
FIG. 6 is a block diagram of a decoder and encoder circuit with an intermediate sample buffer used in another embodiment of the codec proxy system shown in FIG. 2.

FIG. 6 shows another embodiment of the circuitry in the packet transcoding and rebuffering circuit 42 used for transcoding packets between telephony system 'A' and telephony system 'B'. In FIG. 6, the final codec 'B' encoder 56 is responsible for repacking the desired number of speech frames 48 in each packet 46 (FIG. 5) of the output stream 50 for the destination telephony system. The codec 'A' decoder 54 may output audio samples 60 in a defined packet size that is incompatible with the packet size of the codec B encoder 56. A sample buffer 55 is used to repacketize speech samples from the codec A decoder 54 into speech packets 62 of length N samples. The codec 'B' encoder 56 then encodes the decoded speech packets 62 into the synchronous output 50 that is sent to telephony system 'B'.

Other configurations can also be implemented. For example, the codec 'A' decoder 54 might output a continuous output stream of audio samples of length 1. However, the codec 'B' encoder may require N audio samples at a time. The buffer 55 is then used to buffer up the individual samples into the N samples required by the codec B encoder 56.

For simplicity, FIGS. 5 and 6 only show examples of the decoders and encoders used for sending packets from telephony system 'A' to telephony system 'B'. For packets sent in the opposite direction, a similar structure is used only with a codec 'B' decoder first decoding the packets sent by telephony system 'B'. A codec 'A' encoder then repacketizes and encodes the output of the codec 'B' decoder into the encoded format compatible with telephony system 'A'.

The invention is described in terms of telephone systems and codecs that encode audio signals. However, it should be understood that the scope of the invention covers any multimedia application, such as transmitting image data where data needs to be encoded and transmitted between different endpoints, in a packet based network.

Thus, the codec proxy system allows calls to be established and conducted on a packet network between disparate telephony systems and allows non-standard, cost-optimized and/or feature specific packet voice endpoints to interoperate in a standards-based network.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A system for proxying between different telephony systems trying to establish telephone calls in a packet network, comprising:

a first telephony system encoding signals generated at a first endpoint into packets transmitted over the packet network and decoding packets received over the packet network into audio signals at the first endpoint;

a second telephone system encoding signals generated at a second endpoint into packets transmitted over the packet network and decoding the packets received over the packet network into signals at the second endpoint; and a proxy system analyzing how the packets are encoded and decoded at both the first and second telephony systems and proxying the encoding and decoding of the packets so that telephone calls can be established between disparate first and second telephony systems, wherein the proxy system includes a packet transcoding and rebuffering circuit that decodes packets from a sending one of the telephony systems and re-encodes the decoded packets into a format compatible with a receiving one of the telephony systems.

2. A system according to claim 1 wherein the packet transcoding and rebuffering circuit reformats the audio packets by changing the number of frames in the packets.

3. A system according to claim 1 wherein the packet transcoding and rebuffering circuit decodes the audio packets by decompressing packets using a decompression scheme in a sending one of the telephony systems and recompressing the decompressed packets using a compression scheme used in a receiving one of the telephony systems.

4. A system according to claim 1 wherein the packet transcoding and rebuffering circuit includes a codec decoder compatible with an encoder at a sending telephony system and a codec encoder compatible with a decoder for a receiving telephony system.

5. A system according to claim 4 including a sample buffer coupled between the codec decoder and the codec encoder.

6. A method for proxying codecs at opposite endpoints in a packet network, comprising:

determining what codec capabilities a first one of the endpoints in the packet network has for encoding and decoding audio or video signals;

determining what codec capabilities a second one of the endpoints in the packet network has for encoding and decoding audio or video signals;

brokering which codecs to use in the first and second endpoints according to the codec capabilities so a telephone call can be established over the packet network between the first and second endpoints, wherein brokering codecs comprises the following:
- spoofing both the first and second endpoint into believing each is encoding and decoding the audio signals using a common codec;
- decoding encoded audio packets sent by a first one of the endpoints into speech samples; and
- reencoding the decoded speech back into audio packets compatible with a codec at a second receiving one of the endpoints.

7. A method according to claim 6 including formatting the speech samples into speech sample lengths compatible with the codec at the second receiving endpoint before reencoding the decoded speech.

8. A codec proxy system for conducting telephone calls between different telephony systems in a packet network, comprising:
- a first capability exchange proxy for communicating with a first one of the telephony systems;
- a second capability exchange proxy for communicating with a second one of the telephony systems;
- a capability exchange broker identifying and selecting codecs in the first and second telephony systems and communicating the identified codecs through the first and second capability exchange proxy; and
- a packet transcoding and rebuffering circuit coupled to the capability exchange broker that transcodes audio packets from a sending one of the telephony systems to an encoding scheme compatible with a receiving one of the telephony systems when the first and second telephony systems are not compatible.

9. A codec proxy system according to claim 8 wherein the first and second capability exchange proxy each independently exchange capability exchange messages with the first and second telephony systems, respectively.

10. A codec proxy system according to claim 9 wherein the packet transcoding and rebuffering circuit includes a buffer for converting an input stream in a first media packet format into an output stream of packets in a different media packet format.

11. A codec proxy system according to claim 10 wherein the packet transcoding and rebuffering circuit includes a codec decoder for a sending one of the telephony systems and a codec encoder for a receiving one of the telephony systems.

* * * * *